UNITED STATES PATENT OFFICE.

STANISLAUS KALAMAIKOWSKI, OF NEW YORK, N. Y., ASSIGNOR OF ONE-TENTH TO JOHN HEILMANN, OF SAME PLACE.

FIREPROOF PAINT.

SPECIFICATION forming part of Letters Patent No. 619,579, dated February 14, 1899.

Application filed April 18, 1898. Serial No. 678,066. (No specimens.)

*To all whom it may concern:*

Be it known that I, STANISLAUS KALAMAIKOWSKI, a citizen of the United States, residing at the city of New York, in the county and State of New York, have invented certain new and useful Improvements in Fireproof Paints, of which the following is a full, clear, and exact specification.

My invention relates to improvements in compositions for rendering wood and other substances fireproof, and has for its object to provide a paint for the aforesaid purposes; and to this end the invention consists in the novel composition hereinafter more fully set forth and claimed.

In preparing my composition I employ the following ingredients in about the proportions specified: sulfate of magnesia, two parts; borax, two parts; mineral wool, one part; ground glass, six parts; chlorid of zinc, six parts; gilder's whiting or oxid of zinc, twenty-five parts. The above-named ingredients are taken in a finely-powdered state, mixed with water, thoroughly agitated, and then dried. Thereupon the composition is again reduced to a fine powder and combined with pigment color and oil in sufficient quantity to give the composition the consistency of ordinary paint.

While I do not consider the use of sulfate of magnesia absolutely necessary as an ingredient of the composition, I nevertheless prefer to include the same, believing that better results are obtained thereby.

By the term "mineral wool" I wish to be understood to include asbestos.

Having thus described my invention, what I claim, and desire to secure by Letters Patent, is—

1. A fireproof composition consisting of sulfate of magnesia, borax, mineral wool, ground glass, chlorid of zinc, and chalk or oxid of zinc, in about the proportions specified, combined with pigment and a suitable vehicle, as specified.

2. A fireproof composition consisting of sulfate of magnesia, borax, mineral wool, ground glass, chlorid of zinc and gilder's whiting or oxid of zinc, in about the proportions specified, combined with pigment and oil, as specified.

Signed at the city of New York, in the county and State of New York, this 16th day of April, 1898.

STANISLAUS KALAMAIKOWSKI.

Witnesses:
 GUSTAVE DIETERICH,
 JOHN HEILMANN.